2 Sheets—Sheet 1.
J. S. MARSH.
Harvester.
No. 222,978. Patented Dec. 23, 1879.
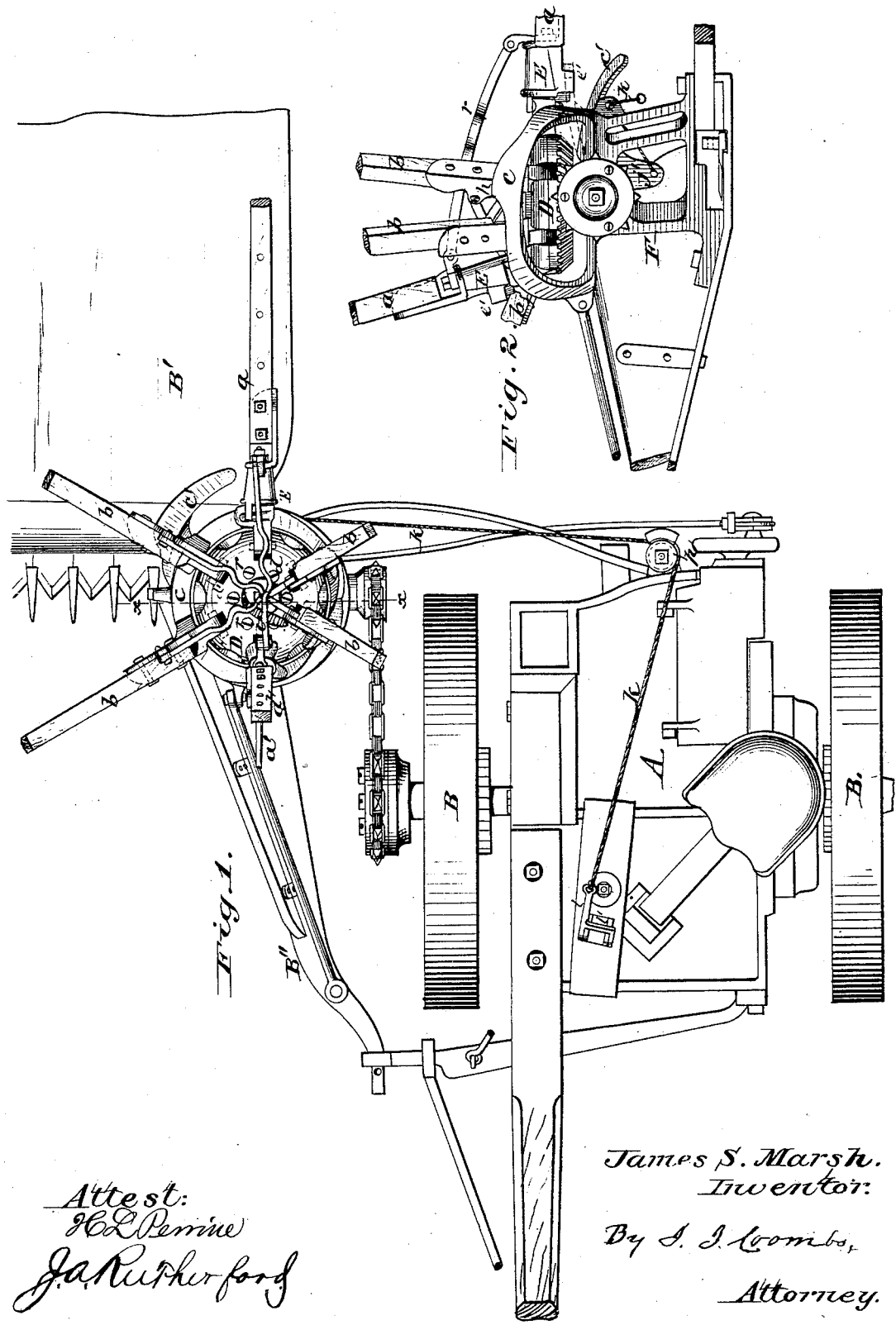
James S. Marsh.
Inventor:
By S. J. Coombs,
Attorney.
Attest:
H. L. Perrine
J. A. Rutherford

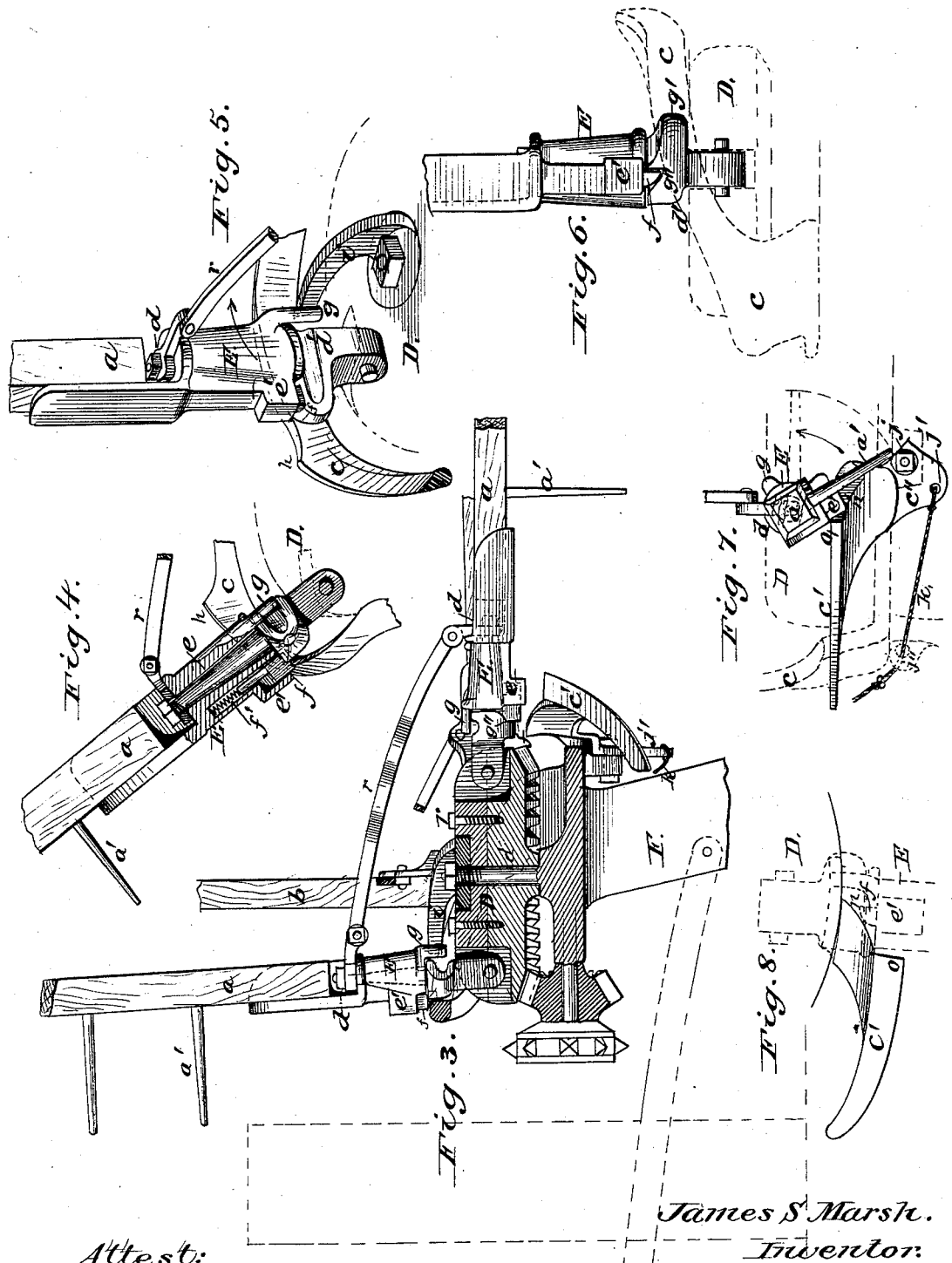

UNITED STATES PATENT OFFICE.

JAMES S. MARSH, OF LEWISBURG, PENNSYLVANIA, ASSIGNOR TO HARRY A. MARSH, OF SAME PLACE.

IMPROVEMENT IN HARVESTERS.

Specification forming part of Letters Patent No. 222,978, dated December 23, 1879; application filed May 11, 1877.

*To all whom it may concern:*

Be it known that I, JAMES S. MARSH, of Lewisburg, in the county of Union and State of Pennsylvania, have invented certain new and useful Improvements in Harvesting-Machines, of which the following is a specification.

This part of my invention relates to improvements in the combined self-rake and reel shown and described in Letters Patent granted to me February 12, 1867, No. 61,944, and February 28, 1871, No. 112,263.

My improvements relate, first, to mechanism for causing the rakes, as they pass the driver, to automatically turn their teeth away from him, and before reaching the platform to be automatically turned back again and locked in proper position for raking; secondly, to mechanism by means of which the driver can cause the rake to turn about the time of reaching the cutters, so that it will not operate upon the cut grain while sweeping over the platform until a sufficient quantity has fallen thereon to form a proper gavel; and, thirdly, to an improvement in the coupling-rod, by which the pair of rakes and the several pairs of reel bars or beaters are coupled together, by means of which said rakes and beaters may be readily adjusted to the circular cam, against which they bear, to compensate for wear.

In the accompanying drawings, Figure 1 is a plan view of a rear side-cut harvesting-machine, or so much thereof as is necessary to exhibit my improvements. Fig. 2 is a side elevation of the combined rake and reel, the rakes and beaters being cut off near their points of attachment to the hub which carries them, and of the standard and its appendages which support said hub. Fig. 3 is a section of the same through line $x\ x$, Fig. 1, the rake-arms being moved in line of section. Fig. 4 is a view, on an enlarged scale, of one of the rakes and of a part of the cam which raises and depresses it, the metal holder of the rake being shown in longitudinal section. Fig. 5 is another view of the same, the metal holder being shown entire. Fig. 6 is another view of the same. Fig. 7 is an end view of one of the rakes, with the hinged and movable portion of the cam, by means of which the driver can prevent the rake from operating upon the cut grain at any sweep, as he may desire. Fig. 8 is a plan view of said hinged and movable portion of said cam.

A is the main frame, B B the driving-wheels, B' the platform, and B'' the drag-bar, all as in my said former Patent No. 112,263. D is the revolving hub which carries the rakes and reel-arms or beaters, and C is the circular cam which causes the rakes and beaters to rise and fall as they rotate. $a\ a$ are the rakes, $a'$ the rake-teeth, $b$ the reel-arms or beaters, and $c'$ is a hinged portion of the cam, by means of which the driver can cause the rakes to operate upon the cut grain, or not, at any sweep, as he may desire.

The stationary cam C, as in my former patents, is so shaped that after the rakes and beaters have passed over the platform they will rise to a nearly vertical position, in which position they will remain till they have passed the driver, and then fall down again to a horizontal position just before reaching the cutters. The rakes are also made to turn about one-fourth of a revolution as they pass the driver, so as to turn the teeth away from him by means which I will now proceed to describe.

The hub D, which carries the revolving rakes and beaters, turns on a stationary vertical journal-post, $d$, and each rake is attached to said hub by means of a cast-iron stump, $d'$, which is pivoted in a recess in the hub, so that it can vibrate in a vertical plane, but cannot turn on the hub. From this stump a conical journal, $e$, projects and enters a conical socket in a metal rake-holder, E, to which the rakes are bolted or screwed. On the lower side of the holder E there is a projection, $e'$, in which there is a longitudinal cavity or socket, in which slides a beveled pawl, $f$, held down by a spring, $f'$. On the side of the rake-holder, nearly opposite said sliding pawl, is a finger, $g$, projecting downward, and on the stump from which the journal $e$ projects is a projection, $g'$, in which there is a notch, $g''$, beveled on one side, as shown in Fig. 6, into which the pawl $f$ is forced by its spring, after the rake has passed the driver and turned into the position for raking, and which locks it in that position and prevents it from turning on its journal until it has passed over the platform.

The circular cam C is so formed that after the rake has passed over the platform it will be caused, by the projection $g'$ on the stump $d'$, to rise to a nearly vertical position, and as it is rising the projection $e'$ on the rake-holder, and the spring-pawl $f$, coming in contact with the highest part of the cam at $h$ the pawl will be pushed up so as to unlock the holder, and the holder will be turned about one-fourth of a revolution on its journal, so as to turn the rake-teeth away from the driver; but soon after passing over said highest part of the cam the finger $g$ of the rake-holder comes in contact with a fixed tripping device, $i$, attached to the journal-post of the hub D, and causes the rake to turn back until the spring-pawl coincides with the notch $g''$, into which it is forced by its spring, and so locks the rake in position for raking, and keeps it so locked until it has again swept over the platform.

In cutting thin grain, however, it often becomes desirable to have each rake make two or more revolutions before sweeping the grain off the platform; and I provide for accomplishing this object as follows: On the side of the cam C, next to the platform, I pivot a vibrating curved plate, $c'$, having a foot, $c''$, projecting downward, which is pivoted to the cam at $j$, and from its lower extremity, at $j'$, a cord or chain, $k$, passing through an eye, $j''$, in the cam-standard, extends to the rear part of the main frame, where it passes around a pulley, $p$, and thence to an upright lever, $l$, on the fore part of the main frame, which lever has a foot-rest, $l'$, by which the driver can operate it with his foot. When it is desired to have the rake pass over the platform without sweeping off the grain, the driver presses said lever forward with his foot, and this raises the hinged plate $c'$ up to a horizontal position, as shown in Fig. 7, and then as the rake comes round the spring-pawl comes in contact with the plate $c'$ at $n$, Figs. 7 and 8, and is pressed back so as to unlock the rake-holder, and the projection $e'$ on said holder strikes the shoulder of said plate at $o$, and turns the rake so that its teeth will project horizontally and pass over the platform without touching the cut grain, as is shown in Fig. 7.

When the driver wants the rake to operate upon the cut grain he simply removes his foot from the lever $l$, and the hinged plate $c'$ falls down out of the way of the rake. In this way the rake may be made to sweep off the grain at every second, third, or fourth revolution, at the option of the driver.

The pair of rakes $a\ a$ and each pair of beaters $b\ b$ are coupled together by rods $r\ r$, having short bends or corrugations, as shown in Fig. 1.

When the cam C and the parts of the rake and beater-holders coming in contact therewith become worn, so as to disturb the adjustment of the rakes and beaters with the cam, the proper adjustment is easily restored by slightly straightening the bends in said rods, which may be done by a few blows with a hammer.

What I claim, and desire to secure by Letters Patent, is—

1. In combination with the hub D and cam C, the rake-stumps $d'$, rake-holders E, spring-pawl $f$, projecting fingers $g$, and fixed tripping device $i$, all constructed and combined to operate substantially as described.

2. In combination with the hub D, cam C, stumps and rake-holders $d'$ and E, the spring-pawl $f$, projecting finger $g$, and fixed tripping device $i$, the hinged plate $c'$, the foot-lever $l$, and connecting cord or chain $k$, all constructed, combined, and arranged to operate substantially as described.

3. In combination with the hub D, cam C, and the rakes and beaters $a$ and $b$, the bent or corrugated coupling-rods $r$, substantially as and for the purpose set forth.

In testimony that I claim the foregoing I have hereunto set my hand in the presence of the subscribing witnesses.

JAMES S. MARSH.

Witnesses:
E. C. WEAVER,
GEO. K. COUPLAND.